United States Patent [19]

Jones

[11] Patent Number: 5,363,471

[45] Date of Patent: Nov. 8, 1994

[54] ELECTRODE BOILERS WITH CYLINDER FULL SENSOR CONTROL

[75] Inventor: Howard C. Jones, Haywards Heath, England

[73] Assignee: Eaton-Williams Group Limited, Edenbridge, England

[21] Appl. No.: 10,743

[22] Filed: Jan. 29, 1993

[51] Int. Cl.$^5$ .......................... H05B 1/02; H05B 3/60
[52] U.S. Cl. ..................... 392/325; 392/327; 392/326; 219/483; 219/492
[58] Field of Search .............. 392/325, 327, 324, 329, 392/326; 219/492, 481, 494, 483, 486, 506, 497

[56] References Cited

U.S. PATENT DOCUMENTS

| | | | |
|---|---|---|---|
| 3,944,785 | 3/1976 | Eaton-Williams | 219/286 |
| 4,382,173 | 5/1983 | Howard-Leicester | 219/295 |
| 4,430,555 | 2/1984 | Stokes | 219/286 |
| 4,675,505 | 6/1987 | Fischer | 219/295 |
| 4,692,591 | 9/1987 | Cooley et al. | 219/295 |
| 4,705,936 | 11/1987 | Fowler | 219/295 |
| 4,883,944 | 11/1989 | Takano et al. | 219/492 |
| 5,079,410 | 1/1992 | Payne et al. | 219/506 |
| 5,130,518 | 7/1992 | Merle | 219/497 |

Primary Examiner—Mark H. Paschall
Attorney, Agent, or Firm—Dickinson, Wright, Moon, Van Dusen & Freeman

[57] ABSTRACT

An electrode boiler comprising a container for containing water and electrodes within the container which serve to pass electrical current through such water and which are generally upright when the boiler is in use. Fill and drain valves are connected to the container to enable water to be fed to and drained from the container. An outlet of the container enables steam generated inside the container to pass out therefrom when the boiler is in use. A water level contact member is arranged to cause a signal to occur when the water in the container reaches a predetermined level. The boiler is provided with a store to store the value of an allowed time for water to boil away from the said predetermined level until the water is no longer in contact with the contact member. A timer is connected to time the actual time it takes for such boiling away to occur, and comparator is connected to the store and the timer to effect a comparison between the allowed time and the said actual time.

7 Claims, 2 Drawing Sheets

ELECTRODE BOILERS WITH CYLINDER FULL SENSOR CONTROL

The present invention relates to electrode boilers with automatic control.

Such electrode boilers have been previously proposed, for example in GB-A-1 418 994 and DE-B-24 07 982 of the present Applicant.

In one previously proposed electrode boiler, current is supplied to its electrodes to cause the water held therein to boil away. When the water in the boiler has boiled away to a certain level, fresh water is supplied to the boiler to refill it. This process is repeated. As a result the concentration of electrolytes in the water increase until a maximum current acceptable is reached. The minimum level of the water which occurs during such a process is that at which the current through the electrodes reaches a minimum set value. The maximum level of the water allowed is determined by a cylinder full pin, which causes a signal to be issued when the water in the cylinder reaches that pin.

Problems have been encountered with such boilers owing to the variation of dissolved substances in the local water supply. When the contents of the boiler have been concentrated by boiling, certain dissolved substances in the water, with the vigour of the boiling, result in a foam being produced. The foam produced may contact the cylinder full pin before the water level has reached the requisite level with the result that the supply of fresh water is stopped and the cylinder is not properly refilled with water. As such boil-fill cycles progress, the water level in the cylinder at any given point in the cycle becomes lower as the amount of foam increases. The boiler then does not operate at full output, and may subsequently be damaged.

It is an aim of the present invention to remedy these problems in a cost effective manner.

Accordingly, the present invention is directed to an electrode boiler comprising a container for containing water, electrodes within the container which serve to pass electrical current through such water and which extend in a generally vertical direction when the boiler is in use, fill and drain means connected to the container to enable water to be fed to and drained from the container, outlet means of the container through which steam generated inside the container can pass when the boiler is in use, a water level contact member arranged to cause a signal to occur when the water in the container reaches a predetermined level so that it contacts the contact member, and control means connected to the water level contact member and the fill and drain means so as to inhibit filling of the container with water beyond the said predetermined level, in which the boiler is provided with circuitry which comprises (a) store means to store the value of an allowed time for water to boil away from the said predetermined level until the water is no longer in contact with the contact member, (b) a timer connected to time the actual time it takes for such boiling away to occur, and (c) comparison means connected to the store means and the timer to effect a comparison between the allowed time and the said actual time, and in which the control means are connected to the comparison means and are constructed to cause draining of water from the container in dependence upon an output from the comparison means, thereby reducing the amount of foaming occurring in the container.

Preferably, a current indicator is connected to the electrodes to provide an indication of the current passing therethrough, and calculator means are connected to (a) the current indicator and (b) the said circuitry, especially the store means and/or the timer, to adjust the output of the comparison means, preferably the value of the allowed time and/or the measured value of the actual time, in dependence upon the value of the current passing through the electrodes immediately following a filling of the container with water up to the level of the contact member.

Desirably, the boiler is provided with a power adjuster to enable the steam output from the boiler to be varied in accordance with the demand, and calculator means are connected to (a) the power adjuster and (b) the said circuitry, especially the store means and/or the timer, to adjust the output of the comparison means, preferably the value of the allowed time and/or the measured value of the actual time, in dependence upon the demand.

The calculator means may be constructed to enable an average value of a plurality of current values and/or demand values to be used to adjust the value of the allowed time and/or the measured value of the actual time.

In one embodiment of the present invention, monitor means are arranged to provide an indication of failure of a draining as mentioned in claim 1 to reduce the said actual time to a value which is less than the allowed time, and the monitor means are connected to the fill and drain means to initiate a greater draining of water from the container in the event that such failure occurs.

The present invention also extends to a method of operating an electrode boiler as set out in the immediately preceding paragraphs.

An example of an electrode boiler made in accordance with the present invention will now be described with reference to the accompanying drawings, in which.

Figure 1:
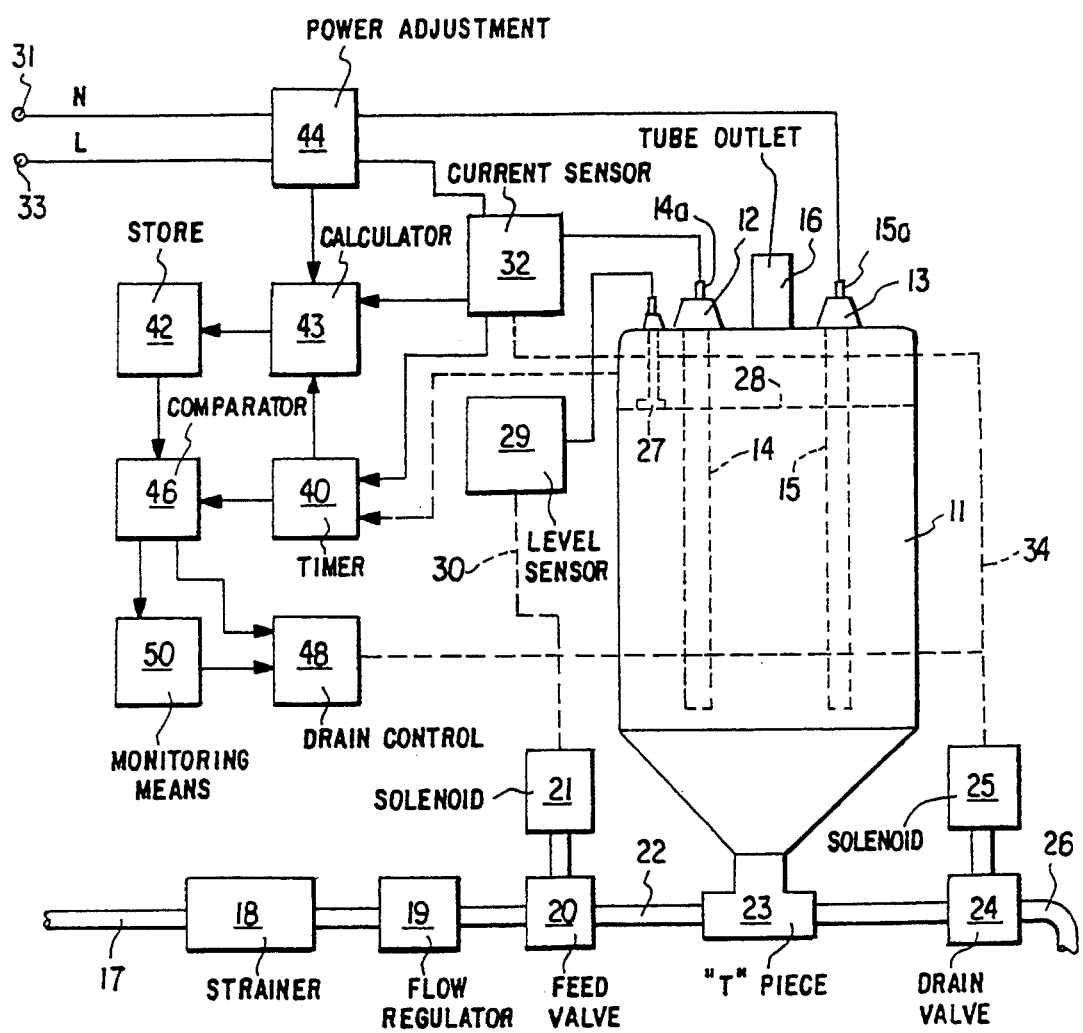
FIG. 1 shows a part elevational, part block circuit diagram of the example.

Referring to FIG. 1, the electrode boiler comprises a container 11, which may conveniently be made of synthetic plastics material, the general structure of the boiler being inexpensive so that when it is thoroughly contaminated with solid matter it may be thrown away rather than dismantled and descaled. The moulded container includes bushes 12 and 13 which support electrodes 14 and 15 (shown dotted) inside the boiler and have respective electrical connections 14a, 15a at their upper ends. These electrodes are shown as cylinders for convenience but they may be comprised of rolls or other structures of wire mesh and may be of any desired shape, to provide particular boiler characteristics. Only two electrodes are shown, for use with a single phase alternating current supply, but more electrodes may be provided for connection to a polyphase supply. The boiler may be of any desired size but a convenient size which has a large field of application holds about ten liters of water with a "boiling space" at the top. At the top of the container is a moulded-on tube 16 through which steam is discharged at substantially atmospheric pressure for use in an air conditioning system. However, if the boiler discharges into a steam hose or into a duct through which air is being blown by a fan the steam discharge might not be quite at atmospheric pressure.

Water is supplied to the boiler through an inlet pipe 17 leading to a strainer 18 from which the water flows through a flow regulator 19. This may conveniently be an automatic flow or pressure regulating device of a kind which is available on the market. From the flow regulator 19 the water passes to an electrically controlled feed valve 20 actuated by a solenoid 21. The water then passes through a pipe 22 to one arm of a "T" piece 23 fixed to the bottom of the container 11. The other arm of the "T" piece 23 forms an outlet and this is connected to a second electrically controlled valve 24 actuated by a solenoid 25. Water passing through the valve 24 passes into a drain pipe 26.

A level sensing electrode 27 is included in the container 11 in order to maintain the water level indicated by the dotted line 28. The sensing electrode 27 is connected to level sensing means 29 which in turn actuates the solenoid 21 as indicated by the dotted line 30.

It will be understood that some form of hysteresis must be provided in the level sensing device 29 to ensure that it does not open and close the feed valve in rapid succession. It may be arranged that the feed valve is not closed until the water level has risen to a desired degree above the bottom of the level sensing electrode or that when the water falls below the bottom of the level sensing electrode the level sensing device does not operate until the water has fallen by a particular amount below this level.

The electrode 15 is connected to the neutral line 31 of a mains supply network while the electrode 14 is connected through a current sensing device 32 to the live conductor 33 of the supply. The current sensing device could be a resistor, means being provided to sense the voltage drop across the resistor, but it is preferred to use a current transformer as described in more detail later. As water is continuously boiled away from the boiler the amount of contamination in the water increases due to the continual supply of new town water. As the degree of contamination increases the electrical resistance of the water falls and the electrode current rises. When the current has risen to the maximum level which is acceptable the current sensing device actuates the solenoid 25 via a line indicated in dotted lines at 34 to open the drain valve 24, whereupon some of the water from the boiler is allowed to drain away. As the water drains away the electrode current falls and when it has fallen to a predetermined lower level the solenoid 25 is de-energized and the drain valve closes.

A timer 40 is connected to the electrode current sensor 32 to provide a measure of the actual time it takes for the electrode current to fall from a peak value to a trough value, indicative of the time it takes after a fill operation for water to be boiled away until it is no longer in contact with the sensing electrode 27. Alternatively, the timer 40 could be connected directly to the sensing electrode 27 to enable it to effect this measurement.

An electronic store 42 is provided which stores a value of an allowed time for such boiling away to occur. It could conceivably comprise a ROM storing that value permanently, but preferably it comprises a RAM which can be updated at predetermined intervals, to adjust the value of the stored allowed time in accordance with prevailing conditions. In particular, the store 42 is connected to receive signals from a calculator 43, which in turn receives signals from the timer 40, the current sensor 32, and also from a power adjustment 44 connected to deliver adjustable power to the electrodes 14 and 15. The signals received by the calculator 43 alter the output thereof to adjust the value of the allowed time as stored in the store 42, in dependence upon the electrode current and the demand.

A comparator 46 is connected to both the timer 40 and the store 42, and is so constructed that it delivers a signal to its output in dependence upon whether the actual time exceeds the allowed time. The output of the comparator 46 is connected to a drain control 48 which in turn operates the drain solenoid 25 in the event that the actual time exceeds the allowed time.

It will be appreciated that the components 40, 42, 43, 46 and 48 may be parts of a duly programmed microprocessor.

During a start-up operation during which a boil-fill cycle is repeated until the concentration of electrolytes in the water in the boiler is sufficient to achieve a desired current (100% current) when the water is in contact with the sensing electrode 27, an approximately constant volume of water is boiled away during each cycle.

After the start-up operation, the time taken for that volume of water to boil away will be at a minimum.

When foaming occurs, contact with the level sensing electrode 27 is prolonged and this effect is used to detect the foaming fault condition.

The illustrated circuitry to detect foaming takes into account the following:

(a) the boil away time from cylinder full after a feed to 100% current is a unique event in the concentration cycle;

(b) when the current is less than 100%, the boil away time referred to in (a) above will take longer because the power input is proportional to the current;

(c) by the nature of equipment the time taken for any two or more similar events in a cycle will be different;

(d) if the unit is an electrode boiler of the construction described in EP-A-0,245,023 of the present Applicant, in which power input to the boiler is controlled by adjusting the proportion of the "on" period compared to the "off" period during burst firing, then the boil away time referred to in (a) above will be additionally extended if the demand level is less than 100% because the power input is proportional to the demand level;

(e) when after the 100% current value is reached, a conductivity reducing drain occurs, the introduction of additional make-up water increases the amount of sensible energy required, which temporarily increases the boil away time mentioned in (a) above; and (f) if the current is less than around 25%, the boil away time in (a) above will be further extended because the heat loss from the cylinder becomes significant.

To assist with the description of operation, the following terms are defined as follows:

CAF=Current after feed
BAR=Boil away release current
BAT=Boil away time
BAT (100%)=Boil away time for 100% current at 100% demand immediately following completion of the start-up procedure
CF=Container full.

To enable the system to work, reference data has to be established. The reference data used in the time in (a) above is the boil away time from CF to the BAR current value when the CAF=100% at CF. As already mentioned, this event is unique and so it has to be predicted. This is done as follows with reference to FIG. 1.

The BAT is dependent upon the power taken by the boiler, so that if the power is at the maximum, the boil away time will be at a minimum. To generate the reference data the boil BAT is multiplied by the % power in use to relate the measured time to that time which would be taken if the power were 100%, by means of the calculator 43. This data is averaged with the previous value and stored in the store 42.

As already mentioned above, the current and the demand level will, if either or both are less than 100%, increase the boil away time because the power input will be less than 100%.

$$\% \text{ Power} = \frac{\% \text{ current } (I) \times \% \text{ demand level } (DL)}{100}$$

Therefore if % I=100% and % DL=100%, then $$\% \text{ Power} = \frac{100 \times 100}{100} = 100\%$$

or if % I=50% and % DL=50%, then $$\% \text{ Power} = \frac{50 \times 50}{100} = 25\%$$

so BAT×% power=the time taken to boil away if the power was 100%.

During the time taken from one feed on until the next, the demand level (DL) could have changed. For every "feed on" to the next "feed on" event the CAF will increase, because the concentration of electrolytes in the water will increase. Because of this, the BAT is updated after every feed on to feed on event. Because each event could take anything from a few to many minutes, the demand may well have changed. Because of this, any change in demand is also used to update the BAT calculation, at lease every minute.

$$\text{So } BAT = \frac{BAT (100\%) \times \% DL \times \% CAF}{10^4}.$$

The stored BAT value is the average of the last two values.

Having created the reference data BAT (100%), a further calculation is required to establish the boil away time which can be allowed before foaming is deemed to have occurred. Firstly, the BAT (100%) value is divided by the present power input. So $(10^4 \times BAT (100\%))/(\% CAF \times \% DL)$=Boil away time If however this calculation were to be exact, a fault would be detected at each event. The nature of the calculator 43 is such that the calculation will not be exact but close enough to be reliably effective and to ensure that spurious foaming corrections do not happen. To this end, an off-set value of time is added to the final calculation to produce the "slow foam time" (SFT), and this is stored for the time being in the store 42.

$$\text{So "slow foam time"} = \left( \frac{BAT (100\%) \times 10^4}{\% CAF \times \% DL} \right) + \text{off set}$$

To ensure proper operation of the start-up procedure, the foam monitoring routine may be cut out until a feed followed by a CF has occurred. The comparator 46 then compares the actual boil away time ($BAT_{act}$), i.e., the time between the feeding of water to the container, with the slow foam time. If the actual time is greater than the slow foam time when the system deems that foaming is occurring, and an output signal from the comparator 46 is accordingly passed to the drain control 48. The latter switches off the supply of power to the electrodes 15 and 16, it opens the drain means 36 for a predetermined time, and then switches the power back on.

Figure 2:
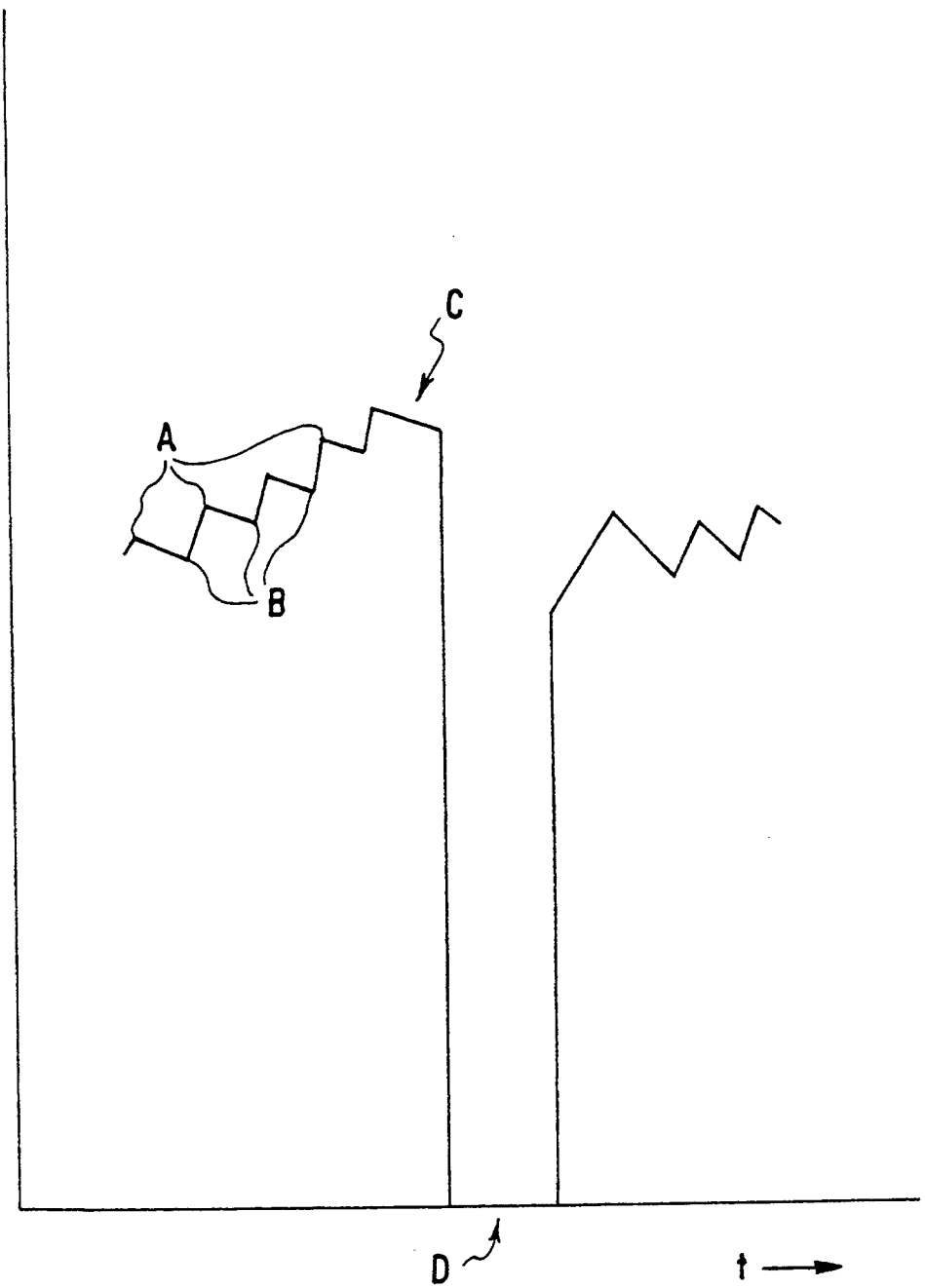
FIG. 2 shows a graph of electrode current plotted against time during the course of operation of the boiler shown in FIG. 1.

The variation of the current through the electrodes 14 and 15 as a function of time, during the operation of the boiler as just described, is illustrated in FIG. 2. During the period illustrated to the left of this Figure, the value of the electrode current passes through a sequence of peaks A and troughs B, representative of a series of boil-fill cycles. Thus, as the water is boiled away from a peak A, the level of the water in the container (11) falls, less of the electrodes 14 and 15 are in contact with the water, and accordingly the current falls more or less linearly, until the level sensing electrode 27 is no longer contacted by the water, as represented by a trough B whereupon the feed valve 20 is opened, and the level rises again (with a consequent linear rise in electrode current) until the water again establishes contact with the level sensing electrode 27 at another peak A.

The peaks A and troughs B generally rise with time as the electrolyte concentration in the water increases.

However, if foaming occurs, more boiling away will be required before the water actually leaves contact with the sensing electrode 27. If it is greater than the SFT value, as at C, a drain sequence occurs as at D in FIG. 2. After the first trough following the drain sequence (the first boil away time being irrelevant owing to the relative coldness of the water), the monitored boil-fill cycles recommence.

On completion of this drain sequence the system then waits for a predetermined time before repeating a foam check—if that proves to be positive, as monitored by monitoring means 50 shown in FIG. 1 to be connected to the comparator 46 and the control 48, then the drain process described above is repeated with the drain means 56 being open for double the period of time it was open the first time.

The system continues the process described above until it determines that no foaming is taking place using the method described above.

Under some circumstances, the slow foam times calculated by the system become large in relation to the requirements and are of no use.

To overcome this problem, the calculator 43 may calculate a BAT value of greater resolution without averaging, and may have means to determine whether that value either doubles or exceeds a predetermined value, whereupon a different correction routine is employed to correct the difficulty.

After a normal conductivity corrective drain, an increased volume of cold water is fed into the cylinder causing the BAT to be increased from the norm. This effect could cause a spurious correction. Because foaming is unlikely to occur following a normal drain, updates are suspended for a period following a drain and a fill. During that period, the SFT previously in use has added to it a background task BAT value until proper revised calculations can be made.

If the current is less than 25%, the heat loss becomes significant causing a disportionate increase in the BAT. To overcome this the normal BAT is doubled to increase the SFT.

Many modifications and variations to the illustrated boiler will be readily apparent to a person of ordinary skill in the art without taking the modification outside the scope of the present invention. For example, whilst the BAT is adjusted to take account of varying power demand and varying boiler electrode current at a given demand level, and the adjusted BAT (including an off set addition) is compared with the actual BAT, the same effect could be obtained by making corresponding adjustments to the measured value of the actual BAT, and then comparing that with the value of the BAT (100%).

I claim:

1. An electrode boiler comprising a container for containing water, electrodes within the container which serve to pass electrical current through such water and which extend in a generally vertical direction when the boiler is in use, fill and drain means connected to the container to enable water to be fed to and drained from the container, outlet means of the container through which steam generated inside the container can pass when the boiler is in use, a water level contact member arranged to cause a signal to occur when the water in the container reaches a predetermined level so that it contacts the contact member, and control means connected to the water level contact member and the fill and drain means so as to inhibit filling of the container with water beyond the said predetermined level, in which the boiler is provided with circuitry which comprises (a) store means to store the value of an allowed time for water to boil away from the said predetermined level until the water is no longer in contact with the contact member, (b) a timer connected to time the actual time it takes for such boiling away to occur, and (c) comparison means connected to the store means and the timer to effect a comparison between the allowed time and the said actual time, and in which the control means are connected to the comparison means and are constructed to cause draining of water from the container in dependence upon an output from the comparison means, thereby reducing the amount of foaming occurring in the container.

2. An electrode boiler according to claim 1, in which a current indicator is connected to the electrodes to provide an indication of the current passing therethrough, and calculator means are connected to (a) the current indicator and (b) the said circuitry to adjust the output of the comparison means in dependence upon the value of the current passing through the electrodes immediately following a filling of the container with water up to the level of the contact member.

3. An electrode boiler according to claim 1, in which the boiler is provided with a power adjuster to enable the steam output from the boiler to be varied in accordance with the demand, and calculator means are connected to (a) the power adjuster and (b) the said circuitry to adjust the output of the comparison means in dependence upon the demand.

4. An electrode boiler according to claim 2, in which the calculator means are constructed to enable an average value of a plurality of current values to be used to adjust the allowed time.

5. An electrode boiler according to claim 2, in which the calculator means are constructed to enable an average value of a plurality of demand values to be used to adjust the allowed time.

6. An electrode boiler according to claim 1, in which monitor means are arranged to provide an indication of failure of a draining as mentioned in claim 1 to reduce the said actual time to a value which is less than the allowed time, and in which the monitor means are connected to the fill and drain means to initiate a greater draining of water from the container than that mentioned in claim 1 in the event that such failure occurs.

7. A method of operating an electrode boiler which comprises a container for containing water, electrodes within the container which serve to pass electrical current through such water and which extend in a generally vertical direction when the boiler is in use, fill and drain means connected to the container, steam outlet means of the container, a water level contact member of the container, control means connected to the water level contact member and the fill and drain means and circuitry which comprises (a) store means to store the value of an allowed time for water to boil away from the water level contact member, (b) a timer connected to time the actual time it takes for such boiling away to occur, and (c) comparison means connected to the store means, the timer and the control means, the method comprising:

(i) feeding water into the container through the fill means;

(ii) generating a signal when the water in the container contacts the water level contact member;

(iii) using the control means to control the fill means to inhibit further filling of the container upon generation of that signal;

(iv) passing an electrical current through the electrodes to boil the water, the steam from which being passed out through said steam outlet means;

(v) storing in the store means the value of an allowed time for water to boil away until the water is no longer in contact with the water level contact member;

(vi) timing the actual time it takes for this to happen by means of the said timer;

(vii) comparing the allowed time and the said actual time by way of the comparison means;

(viii) draining water from the container by way of the drain means in dependence upon that comparison, thereby to reduce the amount of foaming occurring in the container.

* * * * *